US012724888B1

(12) United States Patent
Wang et al.

(10) Patent No.: US 12,724,888 B1
(45) Date of Patent: Sep. 1, 2026

(54) DEVICES, SYSTEMS, AND METHODS FOR DETECTING AND REMEDIATING UNAUTHORIZED, PRIVILEGED ACCESS TO A CORPORATE NETWORK

(71) Applicant: Morgan Stanley Services Group Inc., New York, NY (US)

(72) Inventors: Junlong Wang, Shanghai (CN); Jun Wu, Shanghai (CN); Yihua Tian, Shanghai (CN); John Gao, Shanghai (CN); Julio Caraballo Nunez, New York, NY (US); Jinfeng Luan, Shanghai (CN); Sanket Epili, Singapore (SG)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/294,843

(22) Filed: Aug. 8, 2025

(51) Int. Cl.
*G06F 21/55* (2013.01)
*G06F 21/56* (2013.01)

(52) U.S. Cl.
CPC .......... *G06F 21/554* (2013.01); *G06F 21/566* (2013.01)

(58) Field of Classification Search
CPC ............................ G06F 21/554; G06F 21/566
See application file for complete search history.

(56) References Cited

U.S. PATENT DOCUMENTS 6,647,400 B1 11/2003 Moran
7,065,657 B1 6/2006 Moran
10,120,999 B2 11/2018 Vandergeest
11,455,641 B1 9/2022 Shahidzadeh
11,550,569 B2 1/2023 Makmel
12,218,906 B1 2/2025 Zhong et al.
12,267,368 B1 4/2025 Goberman et al.
2002/0129264 A1 9/2002 Rowland
2014/0053226 A1 2/2014 Fadida
2015/0047032 A1 2/2015 Hannis
2015/0121461 A1* 4/2015 Dulkin ................ H04L 63/1408 726/4
2016/0205115 A1 7/2016 Kulkarni
2017/0223039 A1* 8/2017 Mont ...................... H04L 41/40
2019/0121972 A1* 4/2019 Norvill ................. G06F 21/554
2020/0329062 A1* 10/2020 Beauchesne ............ H04L 63/08
2020/0336497 A1* 10/2020 Seul .................... H04L 63/0263
2020/0404016 A1 12/2020 Pike et al.
2021/0014256 A1* 1/2021 Malhotra ............ H04L 63/1441
2023/0049773 A1* 2/2023 Scheideler ............ G06F 11/327
(Continued)

*Primary Examiner* — Darshan I Dhruv
(74) *Attorney, Agent, or Firm* — K&L Gates LLP

(57) ABSTRACT

A method of detecting and remediating unauthorized, privileged access to a target infrastructure is disclosed herein. The method can include generating a plurality of alert rules associated with a plurality of security events, generating and transmitting an application programming interface (API) call comprising a query generated based on the plurality of alert rules to a Security Information and Event Management (SIEM) sub-system, detecting an unauthorized, privileged access to the target infrastructure based on the plurality of alert rules and a plurality of alerting events received from the SIEM sub-system, generating a remediation action based on the plurality of alert rules, and autonomously implementing the remediation action to secure the target infrastructure in real-time.

20 Claims, 3 Drawing Sheets

(56) References Cited

U.S. PATENT DOCUMENTS

2024/0086538 A1 3/2024 Rowland et al.
2024/0126889 A1* 4/2024 Clark .................... G06F 21/577
2024/0146747 A1* 5/2024 Zaytsev .............. H04L 63/1416
2024/0330450 A1* 10/2024 Hen ...................... G06F 21/554
2024/0346158 A1* 10/2024 Wada .................... G06F 21/552
2024/0430296 A1* 12/2024 Lombardi ........... H04L 63/1441
2025/0007883 A1 1/2025 Wang et al.
2025/0030694 A1* 1/2025 Ben Dov .............. H04L 63/102
2025/0384127 A1* 12/2025 Hooten ................. G06F 21/554

* cited by examiner

202
Generate a plurality of alert rules associated with a plurality of security events 204
Receive a centralized privileged access activity log from privileged access manager sub-system 206
Receive local privileged access activity log from target infrastructure 208
Query SIEM sub-system based on the plurality of alert rules and the activity log 210
Detect occurrence of a security event based on the plurality of alert rules, the centralized activity log, and the local activity log 212
Generate a remediation action based on the plurality of alert rules and in response to the detected security event 214
Autonomously implement the remediation action to secure the target infrastructure in real time

FIG. 2

DEVICES, SYSTEMS, AND METHODS FOR DETECTING AND REMEDIATING UNAUTHORIZED, PRIVILEGED ACCESS TO A CORPORATE NETWORK

BACKGROUND

In an enterprise computing environment, privileged accounts are critical access points that allow users to perform administrative tasks on an infrastructure environment. An infrastructure environment may include various, interconnected assets. Such assets may include hardware and software components, such as databases, servers, computers, operating systems (e.g., Windows, Linux, etc.), applications, and/or directory services. Such components may contain sensitive information and, therefore, the misuse or compromise privileged accounts may represent a significant security risk for the enterprise. This can result in data breaches, system manipulation, and/or disruption of services.

Traditional Privileged Access Management (PAM) systems provide a secure gateway for managing and monitoring privileged user sessions. Such systems may record user activity and restrict access to authorized assets. However, such systems are generally centralized, which makes it easy for malevolent actors to bypass the PAM system, introducing operational risk to the enterprise computing environment. Although PAM systems (e.g., CyberArk, BeyondTrust, Thycotic, Delinea, etc.) are designed to control and log access to sensitive systems, they generally lack the ability to analyze threats in real-time and/or natively consume external log data from other infrastructures. For example, PAM systems generally hand activity logs off to Security Information and Event Management (SIEM) systems, which separately and retroactively assess threat detection. SIEM systems (e.g., Splunk, QRadar, Azure, Sentinel, etc.) focus on log aggregation and alerting, but generally lack the ability to control user sessions or PAM workflows.

Additionally, known PAM solutions require the manual management of assets across the infrastructure environment and lack automated mechanisms to detect and respond to malicious or unauthorized behavior in real-time. SIEM systems may enable the aggregation of centralized logs but are configured for passive threat detection and remediation, requiring reviews, querying, and remediation. This results in a significant time gap between the occurrence of a security event and the detection of such an event, which provides an opportunity for malevolent actors to further compromise the network. SIEM systems are also reliant on Security, Orchestration, Activity, and Response (SOAR) tools to trigger responses, if at all. Known systems, therefore, are stovepiped and lack the ability to detect unauthorized, privileged access to an enterprise network and mitigate such threats in real-time.

SUMMARY

In one general aspect, the present invention is directed to systems and methods for detecting and remediating unauthorized, privileged access to a target infrastructure in a corporate computing environment. In one aspect, a method is provided that includes: generating a plurality of alert rules associated with different types of security events, where each alert rule includes one or more labeled conditions and corresponding predefined remediation instructions; constructing and transmitting a dynamically generated API call based on the alert rules and recent access behavior to a Security Information and Event Management (SIEM) sub-system; receiving, from the SIEM sub-system, a response containing alerting events derived from centralized and local activity logs; detecting an unauthorized, privileged access event by correlating those alerting events with the defined rules using a pattern correlation algorithm; and, in response, selecting and autonomously implementing a remediation action to secure the target infrastructure in real-time. The method further includes logging the remediation action to an immutable audit record.

In another aspect, a detection and remediation system is provided comprising one or more control circuits and memory devices that store a plurality of engines executable to perform the foregoing steps. The system is further configured to interface with a PAM (Privileged Access Management) sub-system and the SIEM sub-system, and to carry out both detection and real-time remediation workflows.

In some embodiments, the security event data includes a centralized privileged access activity log from a PAM sub-system and a local privileged access activity log from the components of the target infrastructure. In certain embodiments, the remediation action comprises revoking elevated session tokens, terminating live user sessions, deleting unauthorized accounts or artifacts from an active directory, or modifying entitlements. The labeled conditions associated with alert rules may include department, risk level, asset type, user role, confidence level, and time sensitivity, among others. These labels can be used to inform both the detection logic and the selection of appropriate remediation steps.

Remediation actions may also include triggering PAM vault rotation, resetting compromised credentials, or blocking suspicious IP addresses. In some embodiments, the audit record is maintained using a tamper-evident mechanism such as a write-once-read-many (WORM) file system or blockchain-based ledger. The system may also generate human-readable alerts, incident tickets, or automated messages to stakeholders in parallel with autonomous remediation.

The present invention can address the lack of real-time detection and remediation capabilities in existing PAM and SIEM systems, the siloed nature of access logging and alert correlation mechanisms, and the inability of conventional systems to automatically enforce security policies based on privileged access anomalies. Embodiments of the present invention can provide a closed-loop architecture that integrates PAM and SIEM workflows with autonomous response capabilities, thereby improving enterprise security posture and reducing the response time to active threats. These and other benefits that can be realized through embodiments of the present invention will be apparent from the description that follows.

FIGURES

Various aspects of the present invention are described herein by way of example in connection with the following figures.

FIG. 2 is an algorithmic flow diagram of detecting and remediating unauthorized, privileged access to a corporate network according to one embodiment of the present invention.

DESCRIPTION

Figure 1:
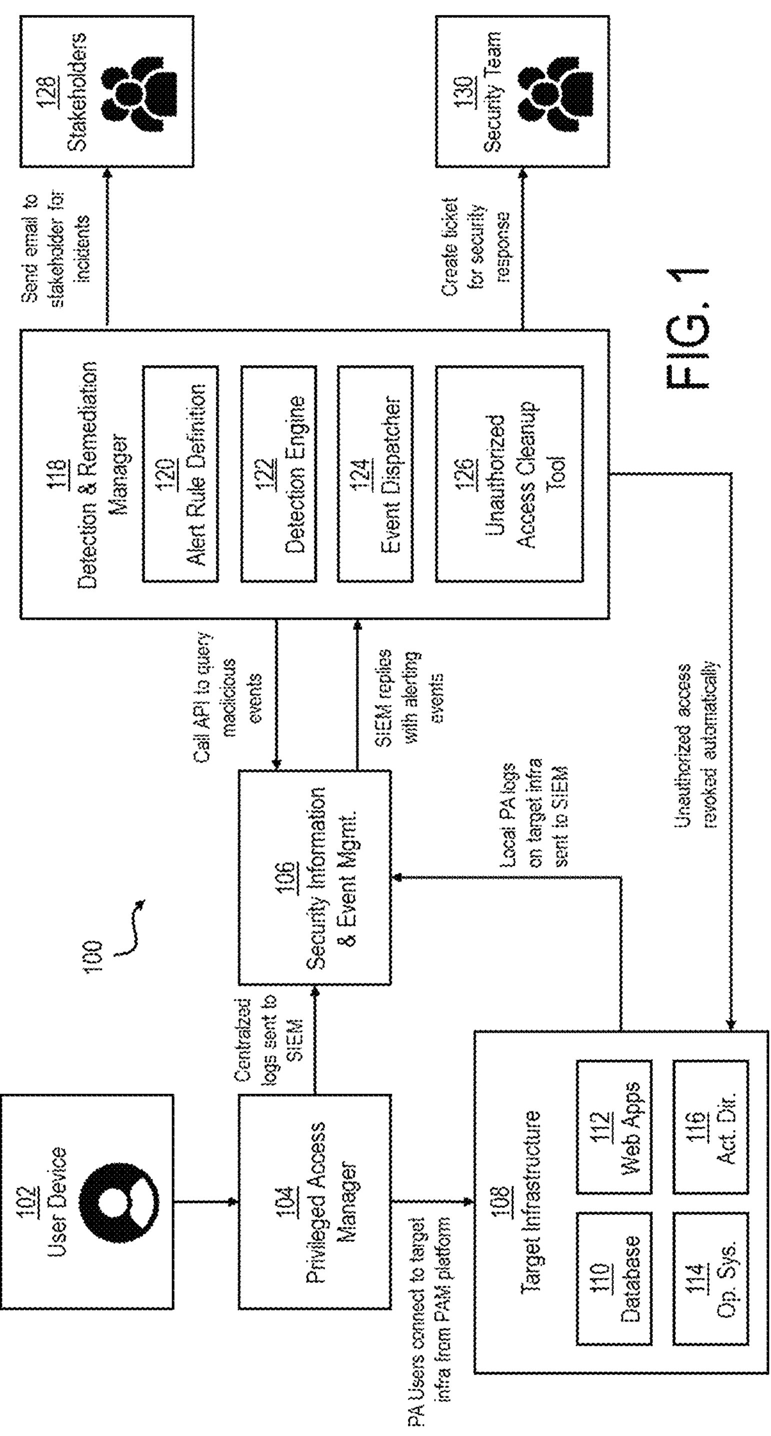
FIG. 1 is a block diagram of a system configured to detect and remediate unauthorized, privileged access to a corporate network according to one embodiment of the present invention.

Referring now to FIG. 1, a block diagram of a system 100 configured to uniformly implement an no known password (NKP) security solution for authentication according to one embodiment of the present invention. According to FIG. 1, the system 10 can include a user computing device 102, a PAM sub-system 104, and SIEM sub-system 106, and a detection and remediation management system 118. The PAM sub-system 104, SIEM sub-system 106, and detection and remediation management system 118 can connect to a target infrastructure 108, which may include at least a portion of an enterprise's IT infrastructure and may include various interconnected components for managing authentication credentials across multiple hosts and platforms. As used herein, the term "enterprise" refers to any organized entity that operates or manages a computing environment comprising multiple systems, devices, or applications, such as a corporation, a government agency, a non-profit institution, an educational organization, or other entities with an information technology (IT) infrastructure that supports users, services, and administrative operations. The enterprise may span on-premises, cloud-based, or hybrid environments, and may employ identity and access management tools, domain controllers, and security protocols to govern system access and credential management. The detection and remediation management system 118 may be connected to one or more computing devices of a stakeholder 128 and/or one or more computing devices of a security team 130. The stakeholder 128, for example, may include a member or employee of the enterprise that uses or depends on the target infrastructure 108. The security team 130, for example, may include a team of individuals responsible for managing the security of the target infrastructure 108.

The PAM sub-system 104 of the system 100 of FIG. 1 can facilitate privileged access to the target infrastructure 108 on behalf of the user computing device 102. The PAM sub-system 104 can include any computing device (e.g., a personal computer, a server, a laptop, a tablet, a smart phone etc.) configured to control and monitor privileged access to the target infrastructure 108 of the enterprise network. Privileged access, for example, can include elevated permissions granted to privileged users of the target infrastructure 108 beyond those of regular users of the target infrastructure 108. For example, such privileges can include the ability to install or delete software, change system configurations, access sensitive data, and/or manage other user accounts, amongst others. It shall be appreciated that, if misused either maliciously or accidentally, privileged access can result in a serious security risk to the target infrastructure 108. The PAM sub-system 104, therefore, may provide certain services, including encrypted or otherwise secured credential vaulting (e.g., the storage of sensitive credentials), just-in-time access (e.g., grants privileged access only for a limited time, reducing the attack surface), least privilege enforcement (e.g., ensures users only get the minimum level of access necessary), session recording and monitoring (e.g., logging activity, such as keystrokes, screen activity, etc. for auditing or compliance), and/or auditing and/or reporting (e.g., providing detailed logs of who accessed what and when and for how long), amongst other functions.

The PAM sub-system 104 may be configured to function as a gateway or proxy positioned between the user computing device 102 and the target infrastructure 108 such that the user computing device 102 cannot directly connect to the target infrastructure 108. Rather, the PAM sub-system 104 authenticates privileged access requests on behalf of the target infrastructure 108. Upon authentication, the PAM sub-system 104 then establishes a connection to the target infrastructure 108 and manages that connection in accordance with a policy. Once connected, the PAM sub-system 104 can generate activity logs associated with the connection, which may include a record of the entire session and/or captured keystrokes, commands run, screen outputs, and other user behaviors. The policies can define which uses can access certain components of the target infrastructure 108, under what conditions the user may access the target infrastructure 108, and/or what commands or actions the user can perform in relation to the target infrastructure 108. The PAM sub-system 104 can provide all activity logs to the SIEM sub-system 106.

As depicted in FIG. 1, the target infrastructure 108 can include one or more databases 110, applications 112 (e.g., web applications), operating systems 114, and/or active directories 116. However, it shall be appreciated that the target infrastructure 108 of FIG. 1 is intended to be merely representative of a number different types infrastructures configured to interface and/or integrate with the PAM sub-system 104 and/or SIEM sub-system 106 of the system 100. The target infrastructure 108, for example, may include an execution environment in which application code, services, or agents execute, and which is capable of receiving and utilizing authentication credentials. An execution environment may include, without limitation, a physical host (e.g., a server), a virtual machine (VM), a container (e.g., a Docker or Kubernetes container), or any other compute instance capable of executing software within an enterprise computing environment. An execution environment is typically operated within a networked infrastructure and may be configured to execute authentication agents (e.g., NKP agents), service applications, or credential consumers. In various embodiments, an execution environment is configured to receive authentication credentials from a credential distribution software system via a secure communication protocol (e.g., SCP, SSH, TLS), and to inject or apply those credentials to an executing process or application runtime without persisting the credentials to disk. For example, the credential may be used to refresh a ticket-granting ticket (TGT) from a domain controller or to authenticate to an enterprise service. An execution environments may be instantiated dynamically, such as in container orchestration platforms (e.g., Kubernetes), or may exist persistently, such as long-lived application servers. They may also include environments running on non-Microsoft operating systems (e.g., Linux or Unix) or Windows-based systems.

The system 100 of FIG. 1 further includes an SIEM sub-system 106 configured to receive activity logs from the PAM sub-system 104. The SIEM sub-system 106 can, for example, provide a centralized node that aggregates activity logs from the PAM sub-system 104 along with local logs generated by the target infrastructure 108. These logs can be received via an application programming interface (API), which may query and be queried via one or more calls sent to and from authorized components. Based on these calls, the SIEM sub-system 104 can provide the system 100 with a centralized log and alert aggregation functionalities, including log ingestion (e.g., collecting logs and event data from the PAM sub-system 104 and target infrastructure 108), normalization and parsing (e.g., converting heterogenous log formats into a common scheme), correlation rules and alerting (e.g., detecting events based on predefined conditions or correlation rules), dashboarding and searching (e.g., allowing human operators to search and investigate all event data), and integrations (e.g., via APIs with external systems that run playbooks).

In some embodiments, the SIEM sub-system 106 is configured to ingest both centralized and local privileged access activity logs. The centralized logs may originate from the PAM sub-system 104 and reflect managed, policy-governed access to the target infrastructure 108, whereas the local privileged access activity logs may be generated natively by the components of the target infrastructure 108 and may include activity outside of PAM oversight. For example, local logs may reflect manual account creation, direct logins, or lateral movement attempts that occur outside of approved PAM workflows. The combination of centralized and local logs enables more comprehensive detection of unauthorized, privileged access events.

Upon receiving logs from the PAM sub-system 104 and the target infrastructure 108, the SIEM sub-system 106 can normalize the ingested data and correlate the normalized data to detect patterns indicative of threats, policy violations, or suspicious activity. These correlations may be done via pre-configured rules, heuristics, or machine learning models. The SIEM sub-system 106 can generate alerts when anomalies or defined threat conditions are detected. While the SIEM sub-system 108 can sometimes be integrated with a response tool or SOAR platform, the SIEM sub-system 106, alone, is fundamentally not configured to monitor unauthorized, privileged access of the target infrastructure 108 or directly enforce or remediate such unauthorized accesses upon detection. Specifically, the SIEM sub-system 106 relies on the detection and remediation sub-system 118 to autonomously detect unauthorized, privileged access to the target infrastructure 108, autonomously revoke unauthorized, privileged access to the target infrastructure 108 upon detection, generate and transmit a ticket to one or more computing devices of the security team 130, generate and transmit a notification that unauthorized, privileged access to the target infrastructure 108 has been detected, generate context-aware remediation actions, and/or provide closed-loop enforcement, amongst other PAM-specific functionality.

It shall be appreciated that the SIEM sub-system 106 need not be responsible for independently detecting unauthorized, privileged access events. Rather, the SIEM sub-system 106 may function as a centralized aggregation platform that receives, normalizes, and correlates security-related activity logs from the PAM sub-system 104 and the target infrastructure 108. In that connection, the SIEM sub-system 106 may apply basic correlation rules to generate structured alerting events, which may indicate potentially anomalous or noteworthy activity, such as repeated failed login attempts or access from unusual geographic locations. These alerting events are then queried and analyzed by the detection engine 122 of the detection and remediation sub-system 118, which applies one or more alert rules and pattern correlation algorithms to determine whether the activity constitutes unauthorized, privileged access to the target infrastructure 108. Each alert rule may include, or be associated with, predefined remediation instructions that specify one or more remediation scripts to be executed when the rule conditions are met.

The detection and remediation sub-system 118, however, functions as an intelligent decision and enforcement layer of the system 100 of FIG. 1, including the SIEM sub-system 106. Specifically, the detection and remediation sub-system 118 can be implemented as centralized tool configured to detect and remediate unauthorized, privileged access to the target infrastructure 108 via a plurality of engines, including an alert rule definition engine 120, a detection engine 122, an event dispatcher engine 124, and an unauthorized access cleanup engine 126. As used herein, the term "engine" can include any combination of firmware, software, executable instructions, logic, or computational elements configured to perform one or more specific functions or processes. For example, each of the plurality of engines can be stored in a memory of the detection and remediation sub-system 118 and executed by a control circuit (e.g., CPU, microprocessor, GPU, logic-based device, etc.) of the detection and remediation sub-system 118.

According some aspects, the detection and remediation sub-system 118 may be a distributed sub-system, meaning it includes multiple computing devices. Thus, one or more of the plurality of engines can be stored, executed, or accessed by separate computing devices of the distributed system. According to other aspects, the functionality of two or more of the plurality of engines can be consolidated into a single engine. In a distributed configuration, the detection and remediation sub-system 118 may be implemented across multiple computing devices, with the constituent engines (e.g., alert rule definition engine 120, detection engine 122, event dispatcher engine 124, and unauthorized access cleanup engine 126) deployed on distinct hardware nodes. These distributed components may communicate over a secure internal network or cloud environment to coordinate detection and remediation operations. This architectural flexibility enables the system to scale horizontally in large enterprise environments while maintaining the functional integration required for real-time, automated security enforcement.

Alert rules can be defined via the alert rule definition engine 120 of the detection and remediation sub-system 118. Alert rules, for example, may be categorized by different labels, including department (e.g., Finance, Human Resources, IT, Operations, Engineering, Legal and Compliance, Executive Level, etc.), risk level (e.g., low or informational, medium or suspicious but not confirmed, high or confirmed/highly probable threat, and/o critical or active threat or breach, etc.), alert type/threat category (e.g., unauthorized privileged access, lateral movement, brute force, credential stuffing, data exfiltration, anomalous login time, inactive user activity, geographic anomaly, etc.), asset type (e.g., domain controller, database server, cloud resource, VPN gateway, workstation, production environment, etc.), user role/access type (e.g., employee, vendor, service account, administrator, end user, etc.), confidence level (e.g., high or confirmed from multiple signals, medium or one system, strong pattern, low or heuristic/single weak indicator, etc.), and/or time sensitivity (e.g., immediate action required, within a predetermined timeframe, batch-reviewed or daily, etc.), amongst others. Labels may be generated by the detection and remediation sub-system 118 based on a user input provided via a user interface communicatively coupled to the detection and remediation sub-system 118.

The detection engine 122 of the detection and remediation sub-system 118 can subsequently use defined alert rules to monitor the SIEM sub-system 106 and detect events. The detection engine may construct API queries dynamically based on deviations in access patterns detected over a defined monitoring window, such as increased frequency of privilege escalations or geographic anomalies over a rolling time frame. The detection engine may further implement a pattern correlation algorithm, such as matching access sequences against known threat signatures, co-occurrence matrices, or labeled temporal event graphs, to detect conditions satisfying an alert rule. For example, defined rules can be used as the basis for SIEM queries the detection engine 122 sends to the SIEM sub-system 106 via one or more API calls. The SIEM sub-system 106 can respond to such calls with SIEM replies, including information associated with the PAM sub-system 104 activity logs and/or local logs generated by the target infrastructure 108. Based on information received from the SIEM sub-system 106 and the defined alert rules, the detection engine 122 can determine that an alert rule has been "fired," meaning an event in which the conditions defined within an alert rule have been satisfied by real-time or batch-ingested data received from the SIEM sub-system 106. This correlation may prompt the event dispatcher engine 124 to take action. The detection engine 122 may implement a pattern correlation algorithm that compares sequences of activity from the alerting events against known threat signatures or behavioral patterns. For example, the algorithm may detect temporal relationships between logins and privilege escalations, identify anomalous login times relative to historical baselines, or correlate access from unusual geographic regions with administrative actions. The pattern correlation may be rule-based, statistical, or machine learning-driven, and may include techniques such as sliding window analysis, time-series clustering, or co-occurrence analysis. These techniques enable the detection engine 122 to determine when the aggregated activity reflects conditions specified by an alert rule.

For example, when a defined alert rule is fired, the event dispatcher engine 124 may dispatch the detected event by taking a predefined action, as required by the defined alert rule. The action may include transmitting information associated with the detected event to the one or more stakeholder devices 128 and/or one or more security team devices 130. According to some aspects, upon detection of the event, the defined rule may cause the event dispatcher engine 124 to trigger an email notification containing details surrounding the unauthorized PA event to a downstream stakeholder or security team. According to other aspects, the defined rule may cause the event dispatcher engine 124 to generate a ticket associated with the unauthorized PA event and/or assign the ticket to a corresponding owner department. According to still other aspects, the defined rule may cause the event dispatcher engine 124 to send details associated with the high-risk unauthorized event to an executive, such as a Chief Information Security Officer, for awareness and subsequent action. All of these actions can be taken in parallel to the event dispatcher engine 124 transmitting information associated with the detected event to the unauthorized access cleanup engine 126.

Upon receiving the information associated with the detected event, the unauthorized access cleanup engine 126 can generate remediation actions or instructions, which may be implemented in real-time. Remediation actions or instructions may be generated by the detection and remediation sub-system 118 based on a user input provided via a user interface communicatively coupled to the detection and remediation sub-system 118. For example, a remediation action may include revoking PA entitlements and/or deleting artifacts (e.g., accounts) created during the unauthorized PA event either locally or within the active directory 116. Additional remediation actions may include revoking elevated session tokens (e.g., Kerberos tickets, SAML tokens, Azure AD access tokens, etc.), terminating live user sessions (e.g., across RDP, SSH, VPN, VDI, etc.), resetting passwords for compromised accounts, disabling user accounts temporarily or permanently, auditing or removing lingering roles or group memberships, and/or triggering PAM vault rotation (e.g., re-randomize privileged credentials) amongst other actions.

The unauthorized access cleanup engine 126 may further perform host/system level actions, such as quarantining affected endpoints from a network of the target infrastructure (e.g., via EDR or NAC integration), restoring affected machines from clean snapshots or golden images, removing unauthorized services or scheduled tasks, killing rogue processes or command/control scripts, and/or revoking API keys or certificates, amongst others. The unauthorized access cleanup engine 126 may further perform network or infrastructure controls, including modifying firewall rules to block suspicious IPs or segments, cutting off lateral movement paths (e.g., removing trust relationships), and/or deactivating VPN accounts or service accounts used in the unauthorized access, amongst others. The unauthorized access cleanup engine 126 may further perform cloud and/or SaaS cleanup functions, including removing unauthorized IAM roles or policies in cloud environments (e.g., AWS, Azure), revoking OAuth grants or app authorizations (e.g., in Google workspace, Microsoft 365), and/or disabling temporary containers (e.g., VMs, or serverless functions) spun up by the intruder, amongst others. The unauthorized access cleanup engine 126 may further perform forensic and traceability enhancements, including tagging affected assets for follow-up investigations, enabling deep logging or full packet capture on suspect systems, and/or creating immutable audit records of all automated remediation steps, amongst others. The unauthorized access cleanup engine 126 may further generate human workflow triggers, including creation of follow-up tickets for manual actions (e.g., HR review, legal review, etc.), send notifications to stakeholders or affected users, and/or flag systems for forensic imaging or investigation hold. The cleanup engine 126 may further log each remediation action to an immutable audit record to ensure forensic traceability and regulatory compliance. In some embodiments, the immutable audit record may be maintained in a write-once-read-many (WORM) file system, an append-only log store, or a cryptographically verifiable ledger such as a blockchain or hash chain. These mechanisms ensure that logged entries cannot be modified or deleted once recorded, providing a tamper-evident trail of all automated security actions executed by the system.

It shall be appreciated that the system 100 of FIG. 1—and more specifically, the detection and remediation sub-system 118—utilizes a fully integrated, closed-loop architecture that detects and remediates unauthorized PA activity in real-time by providing seamless integrations between PA logs and entitlements, SIEM alerting, and a purpose-built detection and remediation tool that acts automatically. Existing SIEM systems, on their own, log a detect threats but are not tailored to detect unauthorized PA events cannot remediate them. Whereas PAM systems may be able to manage accesses, they cannot receive security alerts or act on them. SIEM systems treat PAM logs as just another log source and PAM systems cannot listen to threat detection systems from SIEMs. Such systems are siloed. The detection and remediation sub-system 118, however, actively queries the SIEM sub-system 106 using an API for alerting events based on privileged activity and then correlates those findings with live PAM session data. This transcends mere data aggregation, creating a functional interdependence between systems not normally designed to work together and providing automated remediation actions to enhance security in real-time, without reliance on manual intervention. The system 100 further represents an unprecedented degree of orchestration that leverages detections from the SIEM sub-system 106 to trigger cleanup workflows that reach deep into identity, systems, and network controls. The system may log remediation actions to an immutable audit record, such as a write-once-read-many (WORM) log, a blockchain ledger, or another tamper-evident logging mechanism to ensure traceability and forensic reliability. Although the event dispatcher engine 124 can alert external personnel, the cleanup engine 126 can modify entitlements, restore affected systems, and enhances the security of the target infrastructure 108 autonomously.

Referring now to FIG. 2, an algorithmic flow diagram of a method 200 of detecting and remediating unauthorized, privileged access to a corporate network is depicted according to one embodiment of the present invention. For example, the detection and remediation manager 118 (FIG. 1) may include at least one control circuit and at least one memory configured to store one or more of the aforementioned plurality of engines that, when executed by the control circuit, cause the detection and remediation manager 118 (FIG. 1) to perform one or more steps of the method 200 of FIG. 2.

According to the non-limiting aspect of FIG. 2, the method 200 may include generating 202 a plurality of alert rules associated with a plurality of PAM security events. For example, such alert rules can include unwanted account or group added to local administrator group and/or local account created, amongst others. Definition of such alert rules may further include categorizing each alert rule by a label, such as department (e.g., Finance, Human Resources, IT, Operations, Engineering, Legal and Compliance, Executive Level, etc.), risk level (e.g., low or informational, medium or suspicious but not confirmed, high or confirmed/highly probable threat, and/o critical or active threat or breach, etc.), alert type/threat category (e.g., unauthorized privileged access, lateral movement, brute force, credential stuffing, data exfiltration, anomalous login time, inactive user activity, geographic anomaly, etc.), asset type (e.g., domain controller, database server, cloud resource, VPN gateway, workstation, production environment, etc.), user role/access type (e.g., employee, vendor, service account, administrator, end user, etc.), confidence level (e.g., high or confirmed from multiple signals, medium or one system, strong pattern, low or heuristic/single weak indicator, etc.), and/or time sensitivity (e.g., immediate action required, within a predetermined timeframe, batch-reviewed or daily, etc.), amongst others.

For example, an "unwanted account or group added to local administrators group" alert rule may include an owner department label (e.g., Identity and Access Management), an email cc list label (e.g., server owners), and/or a risk level label (e.g., high). Likewise, a "local account created" alert rule may include an owner department label (e.g., Linux Admin), an email cc list label (e.g., server owners), and/or a risk level label (e.g., medium). Such labels may determine how the detection and remediation manager 118 (FIG. 1) acts on those alert rules upon detection of the unauthorized PAM access event.

The method 200 of FIG. 2 can further include receiving 204 a centralized, privileged access activity log. The centralized, privileged access activity log, for example, may be generated by the PAM sub-system 104 (FIG. 1). Additionally, the method 200 can further include receiving 206 a local, privileged access activity log. The local, privileged access activity log, for example, may be generated by the target infrastructure 108 (FIG. 1). According to some aspects, the centralized, privileged access activity log and the local, privileged access activity log may be received by the SIEM sub-system 106 (FIG. 1). The method 200 can further include querying 208 the SIEM sub-system based on the plurality of alert rules and the activity log and detecting 210 the occurrence of an unauthorized PAM access event based on the plurality of alert rules, the centralized, privileged access activity log, and the local, privileged access activity log. Such detection can occur when the conditions defined within an alert rule have been satisfied by real-time or batch-ingested data (e.g., the activity logs) received from the SIEM sub-system 106. This can involve correlations, which may prompt the event dispatcher engine 124 (FIG. 1) to take action.

In response to detecting the unauthorized PAM access event, the method 200 can further include generating a remediation action based on the plurality of alert rules. Specifically, the remediation action can be generated in accordance with at least one label assigned to the rule which fired. For example, a remediation action may include revoking PA entitlements and/or deleting artifacts (e.g., accounts) created during the unauthorized PA event either locally or within the active directory 116. Additional remediation actions may include revoking elevated session tokens (e.g., Kerberos tickets, SAML tokens, Azure AD access tokens, etc.), terminating live user sessions (e.g., across RDP, SSH, VPN, VDI, etc.), resetting passwords for compromised accounts, disabling user accounts temporarily or permanently, auditing or removing lingering roles or group memberships, and/or triggering PAM vault rotation (e.g., re-randomize privileged credentials) amongst other actions. Remediation actions may include host/system level actions, such as quarantining affected endpoints from a network of the target infrastructure (e.g., via EDR or NAC integration), restoring affected machines from clean snapshots or golden images, removing unauthorized services or scheduled tasks, killing rogue processes or command/control scripts, and/or revoking API keys or certificates, amongst others. Remediation actions may include network or infrastructure controls, including modifying firewall rules to block suspicious IPs or segments, cutting off lateral movement paths (e.g., removing trust relationships), and/or deactivating VPN accounts or service accounts used in the unauthorized access, amongst others. Remediation actions may include cloud and/or SaaS cleanup functions, including removing unauthorized IAM roles or policies in cloud environments (e.g., AWS, Azure), revoking OAuth grants or app authorizations (e.g., in Google workspace, Microsoft 365), and/or disabling temporary containers (e.g., VMs, or serverless functions) spun up by the intruder, amongst others. Remediation actions may include forensic and traceability enhancements, including tagging affected assets for follow-up investigations, enabling deep logging or full packet capture on suspect systems, and/or creating immutable audit records of all automated remediation steps, amongst others. The method 200 can further include autonomously implementing 214 the remediation action to secure the target infrastructure 108 (FIG. 1) in real-time. As previously described, the system may log remediation actions to an immutable audit record, such as a WORM log, a blockchain ledger, or another tamper-evident logging mechanism to ensure traceability and forensic reliability.

Figure 3:
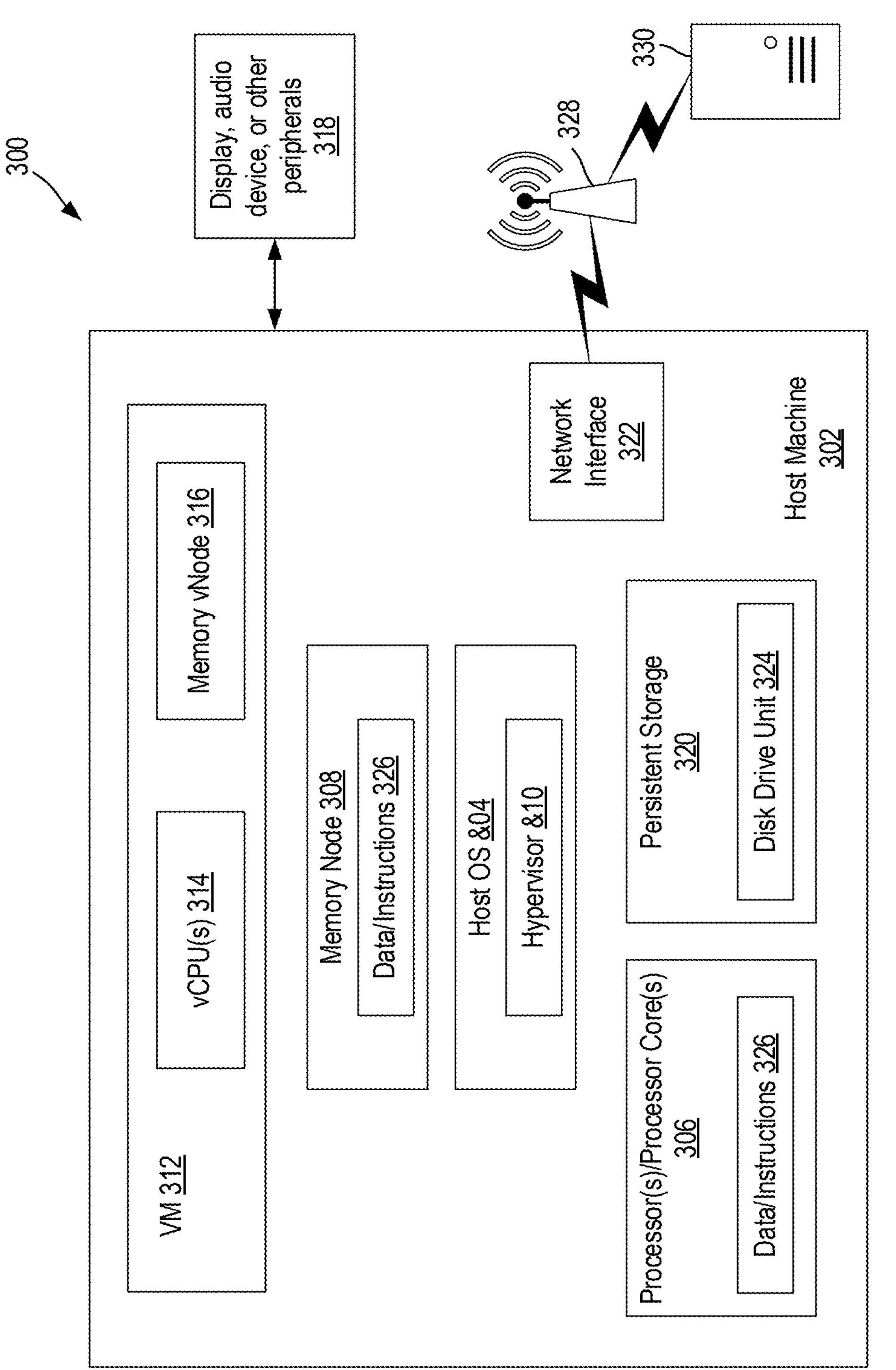
FIG. 3 is a diagrammatic representation of an example computer system according to one non-limiting embodiment of the present invention.

Referring now to FIG. 3, a diagrammatic representation of an example computer system 300 is depicted according to one non-limiting embodiment of the present invention. The computer system 300 includes a host machine 302 within which a set of instructions to perform any one or more of the methodologies discussed herein may be executed, according to at least one aspect of the present invention. The computer system 300 is representative of a computer system used by the system 100 or sub-systems shown in FIG. 1. In various aspects, the host machine 302 operates as a standalone device or may be connected (e.g., networked) to other machines. In a networked deployment, the host machine 302 may operate in the capacity of a server or a client machine in a server-client network environment, or as a peer machine in a peer-to-peer (or distributed) network environment. The host machine 302 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 300 includes the host machine 302, running a host operating system (OS) 304 on a processor or multiple processor(s)/processor core(s) 306 (e.g., a central processing unit (CPU), a graphics processing unit (GPU), or both), and various memory nodes 308. The host OS 304 may include a hypervisor 310 which is able to control the functions and/or communicate with a virtual machine ("VM") 312 running on machine readable media. The VM 312 also may include a virtual CPU or vCPU 314. The memory nodes 308 may be linked or pinned to virtual memory nodes or vNodes 316. When the memory node 308 is linked or pinned to a corresponding vNode 316, then data may be mapped directly from the memory nodes 308 to the corresponding vNode 316.

All the various components shown in host machine 302 may be connected with and to each other, or communicate to each other via a bus (not shown) or via other coupling or communication channels or mechanisms. The host machine 302 may further include a video display, audio device or other peripherals 318 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 320 (also referred to as disk drive unit), and a network interface device 322. The host machine 302 may further include a data encryption module (not shown) to encrypt data. The components provided in the host machine 302 are those typically found in computer systems that may be suitable for use with aspects of the present invention and are intended to represent a broad category of such computer components that are known in the art. Thus, the system 300 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 324 also may be a Solid-state Drive (SSD), a hard disk drive (HDD) or other includes a computer or machine-readable medium on which is stored one or more sets of instructions and data structures (e.g., data/instructions 326) embodying or utilizing any one or more of the methodologies or functions described herein. The data/instructions 326 also may reside, completely or at least partially, within the main memory node 308 and/or within the processor(s) 306 during execution thereof by the host machine 302. The data/instructions 326 may further be transmitted or received over a network 328 via the network interface device 322 utilizing any one of several well-known transfer protocols (e.g., Hyper Text Transfer Protocol (HTTP)).

The processor(s) 306 and memory nodes 308 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 302 and that causes the host machine 302 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the invention as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 302, with each server 330 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology disclosed herein. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In various aspects, therefore, the present invention is directed to computer-implemented systems and methods for detecting and remediating unauthorized, privileged access to a target infrastructure. In various embodiments, the method comprises the step of generating, via a detection and remediation sub-system comprising at least one control circuit and a memory storing executable instructions, a plurality of alert rules associated with a plurality of security events, where each alert rule is associated with one or more labeled conditions and predefined remediation instructions. The method also comprises the step of generating, via the detection and remediation sub-system, an application programming interface (API) call comprising a query dynamically constructed based on the plurality of alert rules and based on a detected change in access patterns over a monitored time window. The method also comprises the step of transmitting, via the detection and remediation sub-system, the API call to a Security Information and Event Management (SIEM) sub-system. The method also comprises the step of receiving, via the detection and remediation sub-system, an API response from the SIEM sub-system, where the API response comprises a plurality of alerting events associated with security-related activity logs from the target infrastructure, where the security-related activity logs are aggregated by the SIEM sub-system. The method also comprises the step of detecting, via the detection and remediation sub-system and using a detection engine executing a pattern correlation algorithm, a detected security event, where the detected security event comprises an unauthorized, privileged access to the target infrastructure based on the plurality of alert rules and the plurality of alerting events received from the SIEM sub-system. The method also comprises the step of, in response to the detected security event, selecting, via a cleanup engine of the detection and remediation sub-system, a remediation action from among a set of predefined response scripts stored in memory, such that the remediation action comprises a remediation script, and where the selection is based on the one or more labeled conditions associated with the alert rule that fired. The method also comprises the step of autonomously implementing, via the detection and remediation sub-system, the selected remediation script to secure the target infrastructure in real-time, including revoking a live privileged session and logging the remediation action to an immutable audit record.

In various implementations, the method further comprises the step of receiving, via the SIEM sub-system, a centralized, privileged access activity log from a privileged access manager sub-system, where the plurality of alerting events comprises information associated with the centralized, privileged access activity log.

In various implementations, the method further comprises the step of receiving, via the SIEM sub-system, the security-related activity logs from the target infrastructure, where the security-related activity logs comprise information associated with a local, privileged access activity log.

In various implementations, the step of autonomously implementing the selected remediation script comprises deleting, via the detection and remediation sub-system, an artifact generated during the unauthorized, privileged access from the target infrastructure. Also, the target infrastructure can comprise an active directory, and where the artifact is stored on the active directory. Also, the artifact can comprise an account.

In various implementations, the method further comprises the step of generating, via the detection and remediation sub-system, the one or more labeled conditions based on a user input provided via a user interface. In that connection, the step of detecting the unauthorized, privileged access to the target infrastructure can further be based on the one or more labeled conditions. Still further, the remediation instructions may be predefined based on the one or more labeled conditions. Further yet, the one or more labeled conditions can comprise a department, a risk level, an alert type, an asset type, a user role, an access type, a confidence level, or a time sensitivity, or combinations thereof.

In various implementations, the plurality of alert rules can comprise detection of an unwanted account or group added to a local administrator group, detection of a local account created, or combinations thereof.

In various implementations, the method further comprises the step of generating, via the detection and remediation sub-system, the predefined remediation instructions based on a user input provided via a user interface.

In various implementations, the step of autonomously implementing the remediation action comprises revoking an elevated session token, terminating a live user session, resetting a password, disabling a user account, auditing a group membership, or triggering a privileged account management vault rotation, or combinations thereof.

In another general aspect, the present invention detection and remediation system, which can comprise at least one control circuit (e.g., e.g., a general-purpose processor, such as a CPU or server-class processor, although other logic-based devices such as microcontrollers or FPGAs may be used in alternative implementations) and at least one memory configured to store a plurality of engines that, when executed by the at least one control circuit, cause the detection and remediation system to: generate a plurality of alert rules associated with a plurality of security events; generate an application programming interface (API) call comprising a query generated based on the plurality of alert rules; transmit the API call to a Security Information and Event Management (SIEM) sub-system; receive an API response from the SIEM sub-system, wherein the API response comprises a plurality of alerting events associated with potential unauthorized, privileged access to a target infrastructure, as detected by the SIEM sub-system; detect an unauthorized, privileged access to the target infrastructure based on the plurality of alert rules and the plurality of alerting events received from the SIEM sub-system; in response to the detected unauthorized, privileged access to the target infrastructure, generate a remediation action based on the plurality of alert rules; and autonomously implement the remediation action to secure the target infrastructure in real-time. The engines can be implemented as software modules stored in memory and executed by the control circuit (e.g., processor(s)), such as executable code libraries, containerized services, or microservices operating within a server environment.

In various implementations, the system further comprises the SIEM sub-system, where the SIEM sub-system is configured to receive a centralized, privileged access activity log from a privileged access manager sub-system, and where the plurality of alerting events comprises information associated with the centralized, privileged access activity log. The SIEM sub-system can further be configured to receive a local, privileged access activity log from the target infrastructure, and wherein the plurality of alerting events further comprises information associated with the local, privileged access activity log.

In various implementations, the remediation action comprises a revocation of a privileged access entitlement from the target infrastructure.

In various implementations, the remediation action comprises a deletion of an artifact generated during the unauthorized, privileged access from the target infrastructure. In that connection, the target infrastructure can comprise an active directory, and wherein the artifact is stored on the active directory.

In yet another general aspect, the present invention is directed to a method of detecting and remediating unauthorized, privileged access to a target infrastructure. Such a method can comprise: generating, via a detection and remediation sub-system, a plurality of alert rules associated with a plurality of security events; receiving, via a Security Information and Event Management (SIEM) sub-system, a centralized, privileged access activity log from a privileged access manager sub-system, where the plurality of alerting events comprises information associated with the centralized, privileged access activity log; receiving, via the SIEM sub-system, a local, privileged access activity log from the target infrastructure, where the plurality of alerting events comprises information associated with the local, privileged access activity log; detecting, via the detection and remediation sub-system, an unauthorized, privileged access to the target infrastructure based on the plurality of alert rules, the centralized, privileged access activity log, and the local, privileged access activity log; in response to the detected unauthorized, privileged access to the target infrastructure, generating, via the detection and remediation sub-system, a remediation action based on the plurality of alert rules; and autonomously implementing, via the detection and remediation sub-system, the remediation action to secure the target infrastructure in real-time.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various aspects have been described herein, it should be apparent that various modifications, alterations, and adaptations to those aspects may occur to persons skilled in the art with attainment of at least some of the advantages. The disclosed aspects are therefore intended to include all such modifications, alterations, and adaptations without departing from the scope of the aspects as set forth herein.

What is claimed is:

1. A computer-implemented method of detecting and remediating unauthorized, privileged access to a target infrastructure, the method comprising:

generating, via a detection and remediation sub-system comprising at least one control circuit and a memory storing executable instructions, a plurality of alert rules associated with a plurality of security events, wherein each alert rule is associated with one or more labeled conditions and predefined remediation instructions;

generating, via the detection and remediation sub-system, an application programming interface (API) call comprising a query dynamically constructed based on the plurality of alert rules and based on a detected change in access patterns over a monitored time window;

transmitting, via the detection and remediation sub-system, the API call to a Security Information and Event Management (SIEM) sub-system;

receiving, via the detection and remediation sub-system, an API response from the SIEM sub-system, wherein the API response comprises a plurality of alerting events associated with security-related activity logs from the target infrastructure, wherein the security-related activity logs are aggregated by the SIEM sub-system;

detecting, via the detection and remediation sub-system and using a detection engine executing a pattern correlation algorithm, a detected security event, wherein the detected security event comprises an unauthorized, privileged access to the target infrastructure based on the plurality of alert rules and the plurality of alerting events received from the SIEM sub-system;

in response to the detected security event, selecting, via a cleanup engine of the detection and remediation sub-system, a remediation action from among a set of predefined response scripts stored in memory, such that the remediation action comprises a remediation script, and wherein the selecting is based on the one or more labeled conditions associated with the alert rule that fired; and autonomously implementing, via the detection and remediation sub-system, the selected remediation script to secure the target infrastructure in real-time, including revoking a live privileged session and logging the remediation action to an immutable audit record.

2. The method of claim 1, further comprising receiving, via the SIEM sub-system, a centralized, privileged access activity log from a privileged access manager sub-system, wherein the plurality of alerting events comprises information associated with the centralized, privileged access activity log.

3. The method of claim 1, further comprising receiving, via the SIEM sub-system, the security-related activity logs from the target infrastructure, wherein the security-related activity logs comprise information associated with a local, privileged access activity log.

4. The method of claim 1, wherein autonomously implementing the selected remediation script comprises deleting, via the detection and remediation sub-system, an artifact generated during the unauthorized, privileged access from the target infrastructure.

5. The method of claim 4, wherein the target infrastructure comprises an active directory, and wherein the artifact is stored on the active directory.

6. The method of claim 4, wherein the artifact comprises an account.

7. The method of claim 1, further comprising generating, via the detection and remediation sub-system, the one or more labeled conditions based on a user input provided via a user interface.

8. The method of claim 7, wherein detecting the unauthorized, privileged access to the target infrastructure is further based on the one or more labeled conditions.

9. The method of claim 7, wherein the remediation instructions are predefined based on the one or more labeled conditions.

10. The method of claim 7, wherein the one or more labeled conditions comprise a department, a risk level, an alert type, an asset type, a user role, an access type, a confidence level, or a time sensitivity, or combinations thereof.

11. The method of claim 1, wherein the plurality of alert rules comprise detection of an unwanted account or group added to a local administrator group, detection of a local account created, or combinations thereof.

12. The method of claim 1, further comprising generating, via the detection and remediation sub-system, the predefined remediation instructions based on a user input provided via a user interface.

13. The method of claim 1, wherein autonomously implementing the remediation action comprises revoking an elevated session token, terminating a live user session, resetting a password, disabling a user account, auditing a group membership, or triggering a privileged account management vault rotation, or combinations thereof.

14. A detection and remediation system comprising:

at least one control circuit; and at least one memory configured to store a plurality of engines that, when executed by the at least one control circuit, cause the detection and remediation system to:

generate a plurality of alert rules associated with a plurality of security events;

generate an application programming interface (API) call comprising a query generated based on the plurality of alert rules;

transmit the API call to a Security Information and Event Management (SIEM) sub-system;

receive an API response from the SIEM sub-system, wherein the API response comprises a plurality of alerting events associated with potential unauthorized, privileged access to a target infrastructure, as detected by the SIEM sub-system;

detect, via detection engine executing a pattern correlation algorithm, an unauthorized, privileged access to the target infrastructure based on the plurality of alert rules and the plurality of alerting events received from the SIEM sub-system;

in response to the detected unauthorized, privileged access to the target infrastructure, generate a remediation action based on the plurality of alert rules; and autonomously implement the remediation action to secure the target infrastructure in real-time, including revoking a live privileged session and logging the remediation action to an immutable audit record.

15. The system of claim 14, further comprising the SIEM sub-system, wherein the SIEM sub-system is configured to receive a centralized, privileged access activity log from a privileged access manager sub-system, and wherein the plurality of alerting events comprises information associated with the centralized, privileged access activity log.

16. The system of claim 15, wherein the SIEM sub-system is further configured to receive a local, privileged access activity log from the target infrastructure, and wherein the plurality of alerting events further comprises information associated with the local, privileged access activity log.

17. The system of claim 14, wherein the remediation action comprises a revocation of a privileged access entitlement from the target infrastructure.

18. The system of claim 14, wherein the remediation action comprises a deletion of an artifact generated during the unauthorized, privileged access from the target infrastructure.

19. The system of claim 18, wherein the target infrastructure comprises an active directory, and wherein the artifact is stored on the active directory.

20. A method of detecting and remediating unauthorized, privileged access to a target infrastructure, the method comprising:

generating, via a detection and remediation sub-system, a plurality of alert rules associated with a plurality of security events;

receiving, via a Security Information and Event Management (SIEM) sub-system, a centralized, privileged access activity log from a privileged access manager sub-system, and generating, via the SIEM sub-system, a plurality of alerting events, wherein the plurality of alerting events comprises information associated with the centralized, privileged access activity log;

receiving, via the SIEM sub-system, a local, privileged access activity log from the target infrastructure, wherein the plurality of alerting events comprises information associated with the local, privileged access activity log;

detecting, via the detection and remediation sub-system and using a detection engine executing a pattern correlation algorithm, an unauthorized, privileged access to the target infrastructure based on the plurality of alert rules, the centralized, privileged access activity log, and the local, privileged access activity log;

in response to the detected unauthorized, privileged access to the target infrastructure, generating, via the detection and remediation sub-system, a remediation action based on the plurality of alert rules; and autonomously implementing, via the detection and remediation sub-system, the remediation action to secure the target infrastructure in real-time, including revoking a live privileged session and logging the remediation action to an immutable audit record.

* * * * *